United States Patent [19]

Girard

[11] Patent Number: 5,239,498

[45] Date of Patent: Aug. 24, 1993

[54] METHODS AND APPARATUS FOR IMPROVED QUOTIENT CORRECTION IN NONRESTORING DIVISION COMPUTATION CIRCUITS

[75] Inventor: Luke Girard, San Jose, Calif.

[73] Assignee: Intel Corporation, Santa Clara, Calif.

[21] Appl. No.: 938,286

[22] Filed: Aug. 31, 1992

[51] Int. Cl.$^5$ ................................................ G06F 7/52
[52] U.S. Cl. ..................................................... 364/764
[58] Field of Search ......................... 364/764, 761, 767

[56] References Cited

U.S. PATENT DOCUMENTS

| | | | |
|---|---|---|---|
| 3,591,787 | 7/1971 | Freiman et al. | 364/767 |
| 4,722,069 | 1/1988 | Ikeda | 364/767 |
| 4,949,295 | 8/1990 | Stearns | 364/761 X |
| 5,023,827 | 6/1991 | Kehl et al. | 364/761 X |
| 5,031,138 | 7/1991 | Maass et al. | 364/767 |
| 5,128,891 | 7/1992 | Lynch et al. | 364/767 |

*Primary Examiner*—Tan V. Mai
*Attorney, Agent, or Firm*—Blakely, Sokoloff, Taylor & Zafman

[57] ABSTRACT

A hardware logic arrangement for quotient correction in high speed higher radix non-restoring division computation circuits producing alternative quotient results of the form Q and Q−1. A two bit per clock quotient bit stream is taken as the output from an divider and selectively latched into positive and negative weighted quotients. These redundant vectors are then seperately steered via appropriate steering logic to a carry-propogate-adder (CPA). An exclusive-OR (XOR) logic block is inserted between the steering logic for one of the vectors and the subtrahend input of the CPA. Operation of the XOR block is governed by a first control signal. A second control signal is coupled to the carry-in input of the CPA. After the last iteration of the division sequence, either Q or Q−1 alternative forms of the result quotient may be produced in the clock cycle required by selectively invoking 2's complement addition when combining the redundant weighted quotients. Where the quotient Q is required, asserting the first control signal to the XOR block inverts the datavalue transmitted to the subtrahend input of the CPA, whereafter both addend and subtrahend inputs are added together in the presence of the second control signal asserted to the carry-in input of the CPA, adding 1 to the sum. Where the alternative result Q−1 is required, only the first control signal is asserted to the XOR block to invert the datavalue transmitted to the subtrahend input of the CPA, whereafter the addend and subtrahend inputs are simply added together.

13 Claims, 3 Drawing Sheets

METHODS AND APPARATUS FOR IMPROVED QUOTIENT CORRECTION IN NONRESTORING DIVISION COMPUTATION CIRCUITS

BACKGROUND OF THE INVENTION

1. Field of the Invention:

The present invention relates to digital information processing systems, and more particularly relates to microarchitecture hardware implementations in connection with certain mathematical algorithms for improving the computing capacity of such systems.

2. Art Background:

Numerical or mathematical functions are provided within a general purpose digital computer by providing arrangements of hardware components implementing numerical algorithms for the particular functions desired. In general, there exist numerous algorithms for solving the commonly encountered mathematical functions including addition, subtraction, multiplication, division, square root and other root finding functions, exponential and trigonometric functions. Because the available surface area of the silicon substrate on which component devices of the hardware arrangement are fabricated is limited, functional circuitry is shared where possible to reduce the number of unique devices which must be fabricated on the silicon. Accordingly, it is common for certain blocks of circuitry to share two, three, or more mathematical functions. For example, floating point division, integer division and square root generation may all be produced in the same functional block, namely a divider.

Dividers may implement varying forms of division, including integer and floating point forms as referred to above. Moreover, both integer and floating point division may be implemented as restoring or nonrestoring methods. Each is uniquely suited to a particular type of application, with nonrestoring division being favored in quotient determination applications, whereas restoring division is most commonly encountered in determination of remainder. The reason for the foregoing is that nonrestoring division can be made to evaluate multiple bits at a time, wherein a quotient may be determined by two, or even three bits each clock cycle. The basis for multiple bit quotient determination is given in numerous articles and books describing SRT radix n division, including, Fandrianto, *Algorithm for High-Speed Shared Radix 4 Division and Radix 4 Square Root* (IEEE Publ. No. CH2419-0/87/0000/0073, 1987), and Hennessy and Patterson, *Computer Architecture—A Quantitative Approach* (1990).

In nonrestoring division, the divisor is iteratively subtracted from the dividend and the remainder evaluated. However, if the remainder is negative, the divisor subtracted from the dividend in the iteration producing the negative remainder will not be restored to the quotient. Rather, with the use of redundant quotient digits, the remainder will be corrected in later iterations, wherein the sign of the remainder is checked. If negative, the divisor is added back to the remainder and the quotient is decremented by 1, thus restoring the operation. In contrast, in dividers implementing restoring division, the sign of the remainder is checked after each subtraction of the dovisor. If the remainder is negative, the operation is immediately restored by adding the divisor back to the remainder and decrementing the quotient by 1, accordingly.

Many implementations of division algorithms utilize what is generally termed "redundant notation" or "redundant from" for representing quotients generated in the division hardware. Moreover, many implementations of division algorithms use alternative forms of a quotient, generally referred to as "Q" and "Q−1" forms, which respectively represent the quotient, and the quotient diminished by one. The benefit of redundant notation is that by maintaining Q and Q−1 forms throughout a nonrestoring division operation, the correct quotient may be produced in the final iteration in cases where the remainder has become negative, without restoring the quotient. In other words, if the remainder is negative after the final subtraction of the divisor from the dividend, and if both Q and Q−1 forms are maintained then determination of the final answer is simply a matter of choosing either the quotient Q or Q−1 in accordance with the sign of the remainder. For example, if upon dividing a by b the quotient is determined in the final iteration to be positive, then the final result will simply be the quotient Q. On the other hand, if upon dividing a by b the remainder is negative, then it will be known that the divisor must be added to the previous partial remainder and the quotient diminished by 1, yielding the Q−1 result.

In prior art hardware configurations, division circuits implementing redundant iterative division algorithms have heretofore required separate data paths, storage registers, and logic implementing algorithms to produce both the Q and Q−1 results. Even if Q and Q−1 are generated by a shared data path, an implicit consequence of the prior art generation and retrieval of Q and Q−1 alternative forms is that additional logic and data path width must be provided to accommodate both alternative forms, thereby affecting the speed path of the division circuit.

As will be explained in more detail in the following detailed description, the present invention provides a compact and simple hardware divider arrangement wherein alternative quotient forms Q and Q−1 are generated on the fly in the clock cycle necessary by simply selecting between one of two control signals applied to simple logic gates and an adder. The present invention permits delivery of alternative quotient forms in the clock cycle for steering the final result onto the output data path.

SUMMARY OF THE INVENTION

A novel hardware implementation for quotient correction in high speed higher radix nonrestoring SRT division computation circuits in digital information processing systems under control of a state machine is disclosed. Input dividend and divisor data values are routed through SRT divide logic. The SRT divide logic iteratively produces redundant positive and negative weighted quotients representative of a nonredundant final quotient to be later formed. The positive and negative weighted quotients are separately latched, and then separately delivered as inputs to a carry-propagate-adder (CPA). An exclusive OR (XOR) logic block is inserted between the latch for the negative weighted quotient and the subtrahend input of the CPA. Operation of the XOR block is governed by a "subtract" control signal issued by the state machine. The CPA is coupled to receive a "carry-in" control signal also issued by the state machine to the carry-in-input of the CPA. The CPA has its output coupled to a quotient output data path, to which the fully formed quotient is routed.

At the end of the final iteration of the nonrestoring SRT division sequence, the present invention easily and quickly generates both Q and Q−1 alternative forms of the resultant quotient with a minimum of logic and time by combining the positive and negative weighted quotients using 2's complement addition. In the case where the quotient Q is required, the first control signal causes the XOR block to invert the weighted quotient transmitted to the subtrahend input of the CPA, after which both addend and subtrahend inputs are added together in the presence of the carry-in control signal asserted to the carry-in input of the CPA, adding 1 to the sum. In the alternative case where the quotient Q−1 is required, the subtract control signal again causes the XOR block to invert the negative weighted quotient transmitted to the subtrahend input of the CPA in the absence of the carry-in control signal, whereby the addend and subtrahend inputs are simply added together. Thus, the XOR block in the quotient output data path of the nonrestoring divider can supply both Q and Q−1 forms of the result on the fly in the same clock cycle, without requiring logic and registers to separately form and store the alternative quotient forms for retrieval in subsequent clock cycles.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

Apparatus and methods for a hardware implementation for quotient correction in high speed higher radix nonrestoring SRT division computation circuits is disclosed. In the following description, for purposes of explanation, specific numbers, times, signals, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Figure 1:
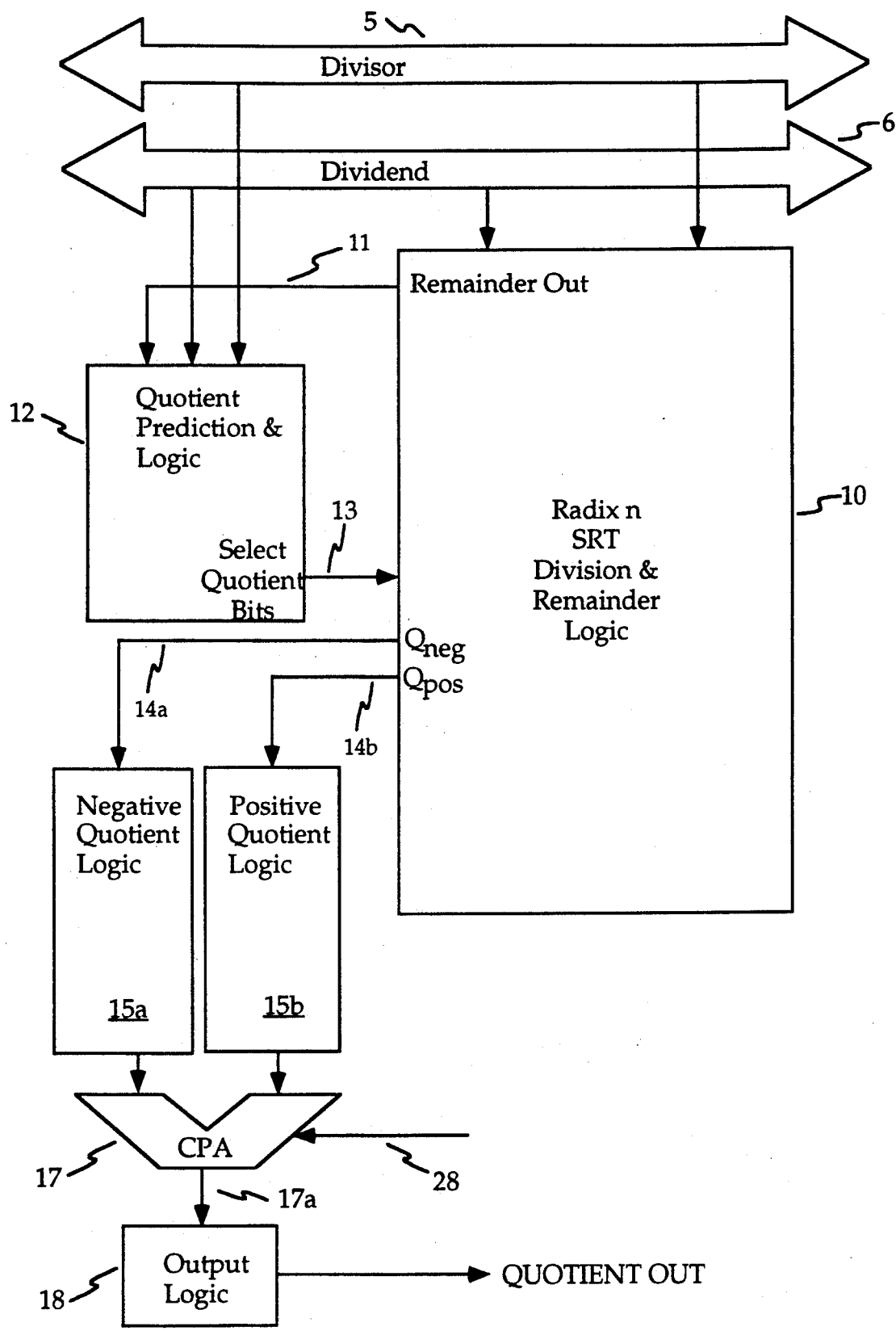
FIG. 1 is a block diagram illustration of a generalized hardware implementation for division using alternative quotient forms incorporating the teachings of the present invention.

Reference is now made to FIG. 1, wherein a generalized divider arrangement for SRT division incorporating the present invention is illustrated. In FIG. 1, a radix n SRT division and remainder logic block 10 receives dividend and divisor signals from, respectively, dividend data path 6 and divisor data path 5 within a floating point processing unit (not shown). Division and remainder block 10 is further coupled to receive a Select Quotient Bits signal 13 from a quotient prediction and logic block 12, which also receives dividend and divisor signals from dividend and divisor data paths 6 and 5, respectively. Quotient prediction and logic block 12 is coupled to receive a "remainder out signal" from division and remainder block 10. Radix n SRT division and remainder block 10 further is seen to produce two redundant output signals, namely, Qneg 14a and Qpos 14b. Qneg 14a and Qpos 14b are, respectively, negative and positive weighted quotient data values, and are in turn, respectively coupled as inputs to negative quotient logic block 15a and positive quotient logic block 15b. Negative and positive quotient logic blocks 15a and 15b are essentially identical, and serve to separately latch and route the Qneg 14a and Qpos 14b signals to carry-propagate-adder (CPA) 17. CPA 17 combines the redundant negative and positive weighted quotient datavalues (Qneg 14a and Qpos 14b) into a single nonredundant quotient 17a. The resultant nonredundant quotient 17a is finally routed through an output logic block 18 onto an output data path (not shown). As discussed above, the resultant quotient 17a is never known precisely following the final iteration of an SRT divider. Instead, the remainder must be tested whether positive or negative, and the quotient corrected accordingly. SRT dividers are generally and here constructed so that the quotient will be wrong by at most one unit following the final iteration, thereby constraining the final result to be either Q or Q−1. As previously discussed, prior art SRT dividers generally provide redundant storage registers or latches to save both Q and Q−1 alternative forms, in addition to the logic necessary to develop Q and Q−1.

As illustrated in FIG. 1, the present invention generates the alternative final quotient forms Q and Q−1 as necessary in the clock cycle required by manipulating the Qneg 14a data value within negative quotient logic block 15a, and thereafter combining the output signals from logic blocks 15a and 15b in CPA 17 in the presence of a control signal 28 in order to properly select the correct quotient form upon the final iteration step. Although not shown in FIG. 1, it should be understood that quotient blocks 15a and 15b implicitly contain appropriate logic hardware to steer and store the redundant quotient data values Qneg 14a and Qpos 14b in a shared division data path used during the division process. In operation, the divider arrangement as illustrated in FIG. 1 delivers dividend and divisor data values 5 and 6 both to the radix n SRT division and remainder block 10 and the quotient prediction and logic block 12. The quotient prediction and logic block 12 will then "guess" the appropriate quotient bits for the ensuing clock cycle, and transmit the guess via the Select Quotient Bits signal 13 to division and remainder logic block 10. Thereafter, division and remainder logic block 10 generates the partial remainder in a known manner in accordance with SRT division principles, and delivers a Remainder Out signal 11 to quotient prediction and logic block 12. Thus, it is seen that division and remainder logic block 10 and quotient prediction block 12 are a particular hardware implementation of an iterative division scheme, and in particular an SRT division scheme which is more particularly described in the U.S. patent application entitled "Method and Apparatus For Overriding Quotient Prediction In Floating Point Divider Information Processing Systems", Ser. No. 07/938,003, filed Aug. 31, 1992. See also the U.S. patent application Ser. No. 7/938,293, entitled "Method And Apparatus For Subtraction With 3:2 Carry-Save-Adders", filed Aug. 31, 1992.

Still referring to FIG. 1, radix n SRT division and remainder logic block 10 routes the alternative redundant forms Qneg 14a and Qpos 14b generated in the iterative division process to the negative and positive quotient logic blocks 15a and 15b, respectively. Although FIG. 1 shows negative and positive quotient blocks 15a and 15b to be connected to division and remainder logic block 10, it should be understood that the particular SRT implementation may also include appropriate steering and data value selection logic and interconnections to division and remainder logic block 10 to provide functional shared data paths. CPA 17 serves to combine the negative and positive weighted redundant forms Qneg 14a and Qpos 14b of the quotient in a known manner consistent with SRT operating parameters. The operation of CPA 17 in part is controlled by control signal 28 sent by a state machine or other controlling arrangement. As shown in FIG. 1, the division hardware arrangement implementing SRT division produces redundant output forms Qneg 14a and Qpos 14b in order to generate the alternative Q and Q−1 forms at their appropriate time.

Figure 2:
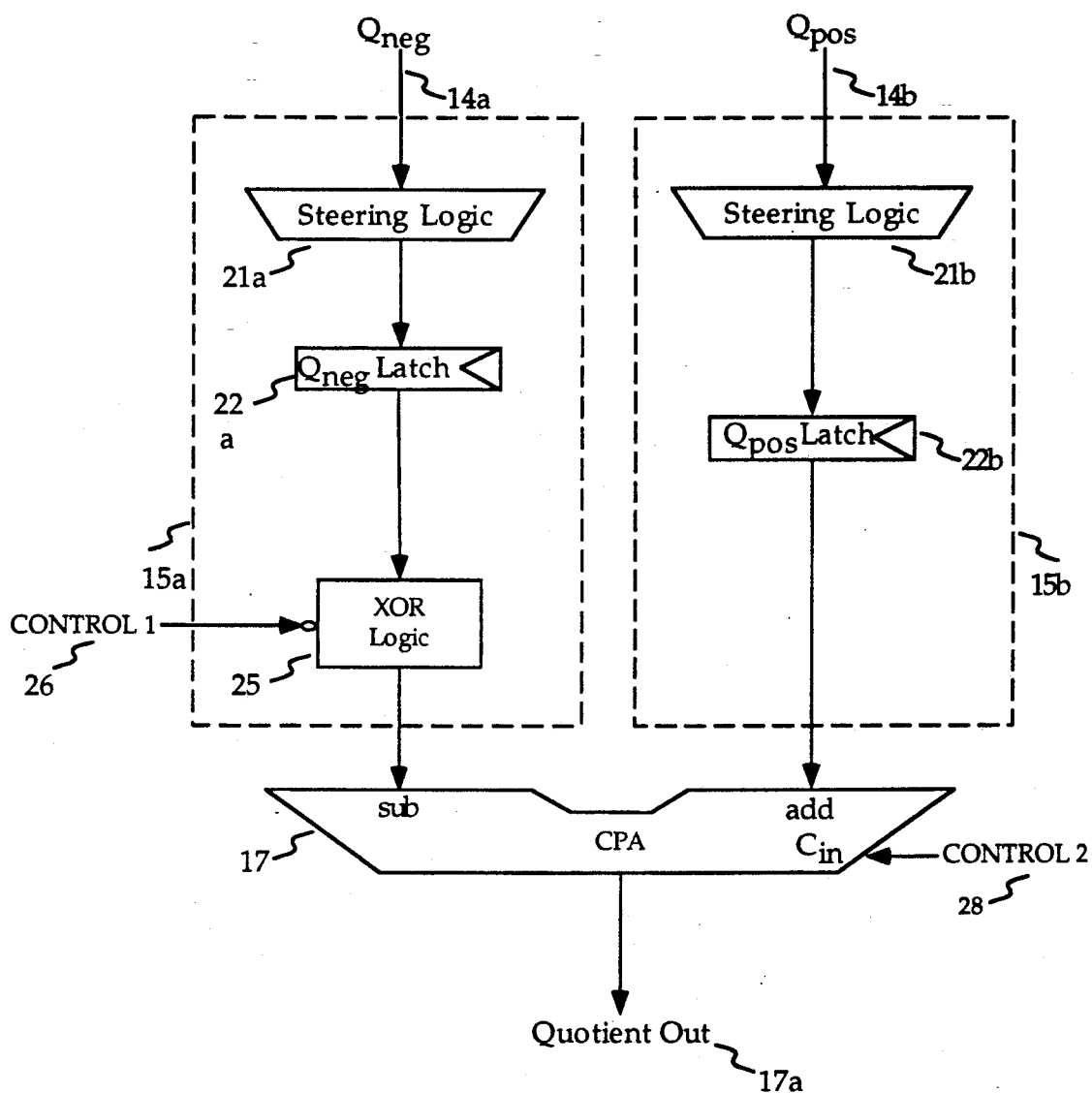
FIG. 2 is a block diagram illustration of the quotient correction hardware incorporated into a divider block according to the present invention.

Reference is now made to FIG. 2, wherein a block diagram view of the present invention is illustrated. In FIG. 2, the redundant forms of an output quotient, namely Qneg 14a and Qpos 14b, are respectively coupled to steering logic blocks 21a and 21b, and are finally latched respectively in Qneg latch 22a and Qpos latch 22b. As presently preferred, Qneg and Qpos (14a and 14b) are generated at the rate of 2 bits per clock. Thereafter, the alternative weighted quotient forms Qneg 14a and Qpos 14b are delivered to CPA 17 to be combined.

The present invention eliminates the need for space consuming logic and storage registers to form and store alternative Q and Q−1 forms by inserting a simple exclusive-OR (XOR) logic block 25 between Qneg latch 22a and CPA 17. The output of XOR logic block 25 is coupled to the subtrahend input of CPA 17. As illustrated in FIG. 2, Qpos weighted quotient form 14b is steered directly to the addend input of CPA 17 after being latched in Qpos latch 22b, without passing through associated logic. Moreover, a first control signal CONTROL 1 is coupled to XOR logic block 25 to govern operation of XOR block 25, and a second control signal CONTROL 2 is used as a carry-in signal to CPA 17. The output of CPA 17 delivers a combined nonredundant form of an output quotient denominated QUOTIENT OUT (17a) to an appropriate output data path, including output logic 18 illustrated in FIG. 1.

In prior art nonrestoring SRT division schemes, multiple bits of quotient are generated in every clock cycle. For example, two bits of quotient may be generated in every division iteration, rather than just one bit. However, on the final iteration, it is not known whether the divisor multiple subtracted from the previous partial remainder will yield a positive or negative remainder. Accordingly, the remainder must be tested to determine whether the sign is positive or negative. If the sign of the partial remainder is negative, the preceding divisor multiple must be added back to the partial remainder, thereby "restoring" the partial remainder to a positive quantity. The reader should note that if the partial remainder is positive following the final division iteration, no restoration operation must be performed, because the partial remainder is already positive and therefore valid. Thus, having completed all division iterations and having determined the sign of the remainder, it remains that either Q or Q−1 final results be delivered as the output of the divide operation, as appropriate. In prior art embodiments, both Q and Q−1 forms would be generated from the final remainder resulting from the division operation.

However, in the present invention, Q and Q−1 alternative forms of the final result are generated on the fly from the redundant Qneg (14a) and Qpos (14b) weighted quotients stored in latches 22a and 22b respectively following the final division iteration, regardless of the sign of the final remainder. In the present invention, either Q or Q−1 is delivered in the clock cycle after the sign of the remainder is examined. The final weighted quotients Qneg 14a and Qpos 14b following the final iteration are, in the preferred embodiment of the present invention, stored in Qneg latch 22a and Qpos latch 22b as previously described, and delivered to CPA 17.

Controlling XOR logic block 25 via control signal CONTROL 1 contemporaneously with assertion of control signal CONTROL 2 to CPA 17 permits addition of a 2's complement data value to be performed on one of the inputs to CPA 17, thereby implementing a subtraction operation. The purpose of subtraction by a CPA 17 will become apparent in the following example. When control signal CONTROL 1 is asserted to XOR logic block 25, XOR logic block 25 invents all bits of data values input to it, thereby forming a 1's complement representation. Moreover, CPA 17 sets the carry-in bit when control signal CONTROL 2 is asserted thereby "adding" unity to the combined result of Input data values to CPA 17. In essence, asserting both CONTROL 1 to XOR logic block 25 and CONTROL 2 to CPA 17 performs the addition of a 2's compliment representation of a data value, resulting in a subtraction operation between the inputs to CPA 17.

For example, given A as the addend and B as the subtrahend (where B* is the 1's compliment of B), let $A+B^*+1=Q$.

where unity is added by asserting the carry-in to CPA 17.

Then, to deliver the Q−1 alternative form, all that is required is $A+B^*+1-1=Q-1$, or $A+B^*=Q-1$.

Therefore, it is easily seen that if the control signal CONTROL 2 to the carry-in-input of CPA 17 is not asserted under control of the state machine during subtraction, no carry-in is performed, and Q−1 form of the final quotient is generated. Alternatively, if the control signal CONTROL 2 is asserted to CPA 17 causing a carry-in while control signal CONTROL 1 is also asserted to XOR logic block 25 causing a bit-for-bit inversion of the Qneg negative weighted quotient 14a, then quotient form Q is delivered. CONTROL 1 therefore operates as an "inversion" control signal, whereas CONTROL 2 operates as a "carry-in" signal. The reader will appreciate that by simply toggling control signal CONTROL 2 between asserted and deasserted states in the presence of an asserted CONTROL 1 signal, alternative forms Q and Q−1 may be delivered as final result quotient out in the precise clock cycle required. Note that CONTROL 1 (i.e., inversion) is asserted to produce both Q and Q−1 results because both quotient forms use the 1's complement of Qneg 14a.

The present invention is a significant improvement over prior art divider implementations where duplicate storage registers are implemented to store alternative Q and Q−1 forms, or where a significant number of logic gates and elements are required in order to produce both quotient forms. Typically, such prior art dividers detect a negative partial remainder condition, feed back the sign, test and add a divisor multiple in the case of negative partial remainder, subtract 1 from the restored quotient, and then store both Q and Q−1 forms in order to make available the alternative quotient results when the final result is delivered. In contrast, the present invention delivers either Q or Q−1 in the clock cycle where the result is to be delivered, based solely on the sign of the previous partial remainder. Accordingly, the present invention is a simplified and compact hardware implementation to deliver alternative Q and Q−1 quotient forms. The present invention reduces the speed and data path constraints associated with routing multiple quotient forms according to the prior art methods and implementations. The present invention thereby increases operating margin, and at the same time decrease circuit layout area.

Figure 3:
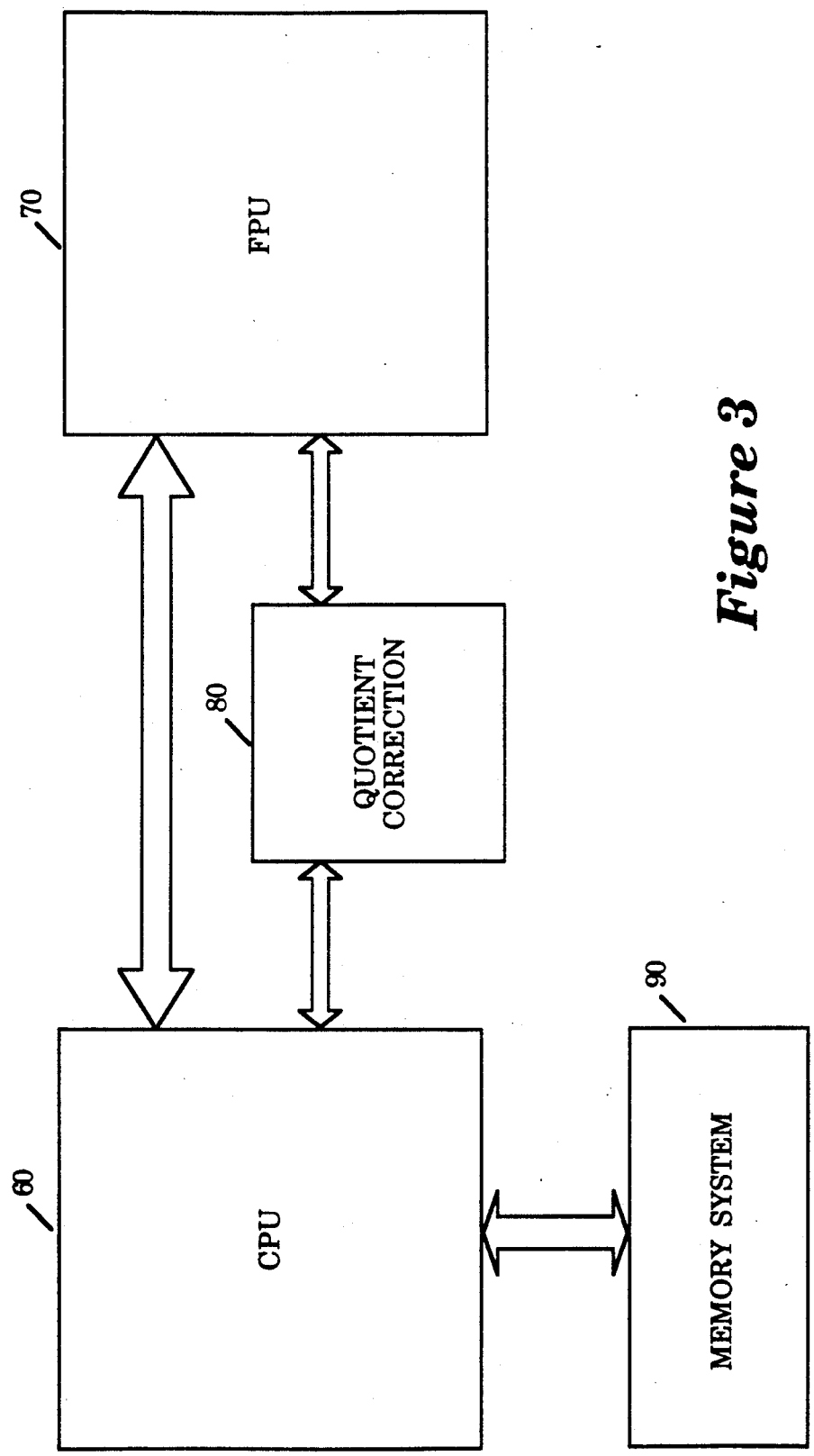
FIG. 3 is a computer system that employs the teachings of the present invention.

FIG. 3 shows a computer system, including a central processing unit (CPU) 60, a floating-point unit (FPU) 70, a memory system 90, and a quotient correction circuit 80. The FPU 70 implements a divider that generates the remainder data value (Remainder Out 11) and the positive and negative quotient data values (Qneg 14a and Qpos 14b). The quotient correction circuit 80 receives the Qneg 14a and Qpos 14b and generates the final output quotient 17a.

The foregoing has described a hardware implementation for quotient correction in high-speed higher radix nonrestoring SRT division computation circuits in digital information systems. It is contemplated that changes and modifications may be made by one of ordinary skill in the art, to the device components and arrangements of elements of the present invention without departing from the spirit and scope of the invention.

I claim:

1. A divider circuit for a math processor in a computer system, comprising:

divider logic receiving a divisor data value over a first data path and a dividend data value over a second data path, the divider logic generating a remainder data value, and iteratively generating quotient data values in a redundant form comprising a positive quotient data value and a negative quotient data value;

negative quotient circuit receiving the negative quotient data values and shifting the negative quotient data values into a final negative quotient register, the negative quotient circuit inverting a final negative quotient data value in the final negative quotient register if a first control signal is in a first state;

positive quotient circuit receiving the positive quotient data values and shifting the positive quotient data values into a final positive quotient register;

adder circuit receiving the final negative quotient data value, a final positive quotient data value from the final positive quotient register, and a carry-in control signal, the adder circuit generating a nonredundant final quotient if the carry-in control signal is in the first state, the adder circuit generating a nonredundant final quotient minus one if the carry-in control signal is in a second state.

2. The divider circuit of claim 1, wherein the negative quotient circuit comprises:

negative quotient register for storing the final negative quotient data value;

steering circuit receiving the negative quotient data values and shifting the negative quotient data values into the negative quotient register;

exclusive-OR circuit receiving the final negative quotient data value from the negative quotient register, the exclusive-OR circuit receiving the first control signal and inverting the final negative quotient data value if the first control signal is in the first state.

3. The divider circuit of claim 2, wherein the positive quotient circuit comprises:

positive quotient register for storing the final positive quotient data value;

steering circuit receiving the positive quotient data values and shifting the positive quotient data values into the positive quotient register.

4. The divider circuit of claim 3, wherein the adder circuit comprises a carry propagate adder having a subtrahend input receiving the final negative quotient data value from the exclusive-OR circuit, and having an addend input receiving the final positive quotient data value from the positive quotient register, and having a carry-in input receiving the carry-in control signal indicating whether the remainder data value is positive or negative.

5. The divider circuit of claim 1, wherein the divider logic generates the remainder data value, and iteratively generates the quotient data values according to a radix 4 SRT division.

6. In a math processor of a computer system, wherein the math processor receives a divisor data value and a dividend data value, and generates a remainder data value, and iteratively generates quotient data values in a redundant form comprising a positive quotient data value and a negative quotient data value, a quotient correction circuit, comprising:

negative quotient register for storing a final negative quotient data value;

first steering circuit receiving the negative quotient data values and shifting the negative quotient data values into the negative quotient register;

exclusive-OR circuit receiving the final negative quotient data value from the negative quotient register, the exclusive-OR circuit receiving a first control signal and inverting the final negative quotient data value if the first control signal is in a first state;

positive quotient register for storing a final positive quotient data value;

second steering circuit receiving the positive quotient data values and shifting the positive quotient data values into the positive quotient register;

adder circuit receiving the final negative quotient data value from the exclusive-OR circuit, the final positive quotient data value from the positive quotient register, and a second control signal indicating whether a remainder data value is positive or negative, the adder circuit generating a nonredundant final quotient if the second control signal indicates the remainder data value is positive, the adder circuit generating the nonredundant final quotient minus one if the second control signal indicates the remainder data value is negative.

7. The quotient correction circuit of claim 6, wherein the adder circuit comprises a carry propagate adder having a subtrahend input receiving the final negative quotient data value from the exclusive-OR circuit, and having an addend input receiving the final positive quotient data value from the positive quotient register, and having a carry-in input receiving the second control signal.

8. The quotient correction circuit of claim 6, wherein the math processor generates the remainder data value, and iteratively generates the quotient data values according to a radix 4 SRT division.

9. A digital information processing system, comprising:
   central processing means;
   memory means storing instructions and data for the central processing means;
   floating-point processing means communicating with the central processing means, the floating-point processing means generating a remainder data value, and iteratively generating quotient data values in a redundant form comprising a positive quotient data value and a negative quotient data value;
   negative quotient circuit receiving the negative quotient data values and shifting the negative quotient data values into a final negative quotient register, the negative quotient circuit inverting a final negative quotient data value in the final negative quotient register if a first control signal is in a first state;
   positive quotient circuit receiving the positive quotient data values and shifting the positive quotient data values into a final positive quotient register;
   adder circuit receiving the final negative quotient data value, a final positive quotient data value from the final positive quotient register, and a carry-in control signal, the adder circuit generating a nonredundant final quotient if the carry-in control signal is in the first state, the adder circuit generating a nonredundant final quotient minus one if the carry-in control signal is in a second state.

10. The digital information processing system of claim 9, wherein the negative quotient circuit comprises:
    negative quotient register for storing the final negative quotient data value:
    steering circuit receiving the negative quotient data values and shifting the negative quotient data values into the negative quotient register;
    exclusive-OR circuit receiving the final negative quotient data value from the negative quotient register, the exclusive-OR circuit receiving the first control signal and inverting the final negative quotient data value if the first control signal is in the first state.

11. The digital information processing system of claim 10, wherein the positive quotient circuit comprises:
    positive quotient register for storing the final positive quotient data value;
    steering circuit receiving the positive quotient data values and shifting the positive quotient data values into the positive quotient register.

12. The digital information processing system of claim 11, wherein the adder circuit comprises a carry propagate adder having a subtrahend input receiving the final negative quotient data value from the exclusive-OR circuit, and having an addend input receiving the final positive quotient data value from the positive quotient register, and having a carry-in input receiving the carry-in control signal indicating whether the remainder data value is positive or negative.

13. The digital information processing system of claim 9 wherein the floating-point processing means generates the remainder data value, and iteratively generates the quotient data values according to a radix 3 SRT division.

* * * * *

UNITED STATES PATENT AND TRADEMARK OFFICE
CERTIFICATE OF CORRECTION

PATENT NO. : 5,239,498
DATED : August 24, 1993
INVENTOR(S) : Girard

It is certified that error appears in the above-indentified patent and that said Letters Patent is hereby corrected as shown below:

Background of the Invention:

Col. 1, line 65, remove "dovisor" and insert -- divisor --.

Col. 2, line 3, remove "from" and insert -- form --.

Col. 2, line 16, after "maintained" insert -- , --.

Detailed Description of the Invention:

Col. 6, line 25, remove "invents" and insert -- inverts --.

Col. 6, line 67, between "out" and "in" insert -- 17a --.

Claim 13, Col. 10, line 36 replace "3" with -- 4 --.

Signed and Sealed this

Fifteenth Day of November, 1994

Attest:

BRUCE LEHMAN

*Attesting Officer*     *Commissioner of Patents and Trademarks*